(12) United States Patent
Giboyau et al.

(10) Patent No.: US 10,793,174 B2
(45) Date of Patent: Oct. 6, 2020

(54) TROLLEY FOR HANDLING A CONTAINER INTENDED FOR CONNECTION TO AN INSULATOR

(71) Applicant: GETINGE LA CALHENE, Vendome (FR)

(72) Inventors: Mathieu Giboyau, Vendome (FR); Wenceslas Daniel, Vineuil (FR)

(73) Assignee: GETINGE LA CALHENE, Vendome (FR)

( * ) Notice: Subject to any disclaimer, the term of this patent is extended or adjusted under 35 U.S.C. 154(b) by 50 days.

(21) Appl. No.: 15/974,214

(22) Filed: May 8, 2018

(65) Prior Publication Data
US 2018/0327012 A1    Nov. 15, 2018

(30) Foreign Application Priority Data
May 9, 2017 (FR) .................................... 17 54062

(51) Int. Cl.
| | |
|---|---|
| *B62B 3/04* | (2006.01) |
| *G21F 5/14* | (2006.01) |
| *B62B 3/10* | (2006.01) |

(52) U.S. Cl.
CPC ............... *B62B 3/04* (2013.01); *B62B 3/104* (2013.01); *G21F 5/14* (2013.01); *B62B 2202/02* (2013.01)

(58) Field of Classification Search
CPC ....... B62B 3/04; B62B 3/104; B62B 2202/02; B62B 2203/071; B62B 2203/10; B62B 2203/60; B65G 69/183; G21F 5/14
(Continued)

(56) References Cited

U.S. PATENT DOCUMENTS 3,087,630 A * 4/1963 Karnow .................... F41A 9/87
414/590
3,820,665 A * 6/1974 Fisher ....................... C21C 5/48
414/590
(Continued)

FOREIGN PATENT DOCUMENTS

CN     204190775 U     3/2015
DE     10010995 A1 *  8/2001     ........... B65G 69/183
(Continued)

OTHER PUBLICATIONS

European Search Report for European Application No. 18170939, dated Jan. 23, 2019.
(Continued)

*Primary Examiner* — James Keenan
(74) *Attorney, Agent, or Firm* — Pearne & Gordon LLP (57) ABSTRACT

A handling trolley for at least one container (C) for its leakproof connection to an insulator via hermetically sealed connection, the connection being achieved by rotation of the container (C) relative to part of the insulator about an approximately vertical axis, the trolley (CH) comprising a support plate intended to support the container (C), structure enabling displacement of the trolley relative to the floor, structure for lifting the container in order to mate the container to the insulator, the first position indexing rod (26) on the trolley (CH) relative to the insulator intended to coincide with the second position indexing rod on the insulator, and angular orientation notch (24) on the container (C) relative to the trolley (CH) such that the container (C) is in a specified position relative to the insulator when the trolley (CH) is in a position determined by the correspondence between the first and second position indexing rods.

13 Claims, 7 Drawing Sheets

(58) Field of Classification Search
USPC ................ 280/79.5; 414/396, 401, 402, 590
See application file for complete search history.

(56) References Cited

U.S. PATENT DOCUMENTS

| | | | | | |
|---|---|---|---|---|---|
| 3,829,063 | A | * | 8/1974 | Holzworth | B62B 3/0618 254/2 R |
| 5,019,324 | A | * | 5/1991 | Schulte | G21C 19/32 376/260 |
| 5,123,803 | A | * | 6/1992 | Crabtree | B62B 3/10 269/17 |
| 5,263,521 | A | * | 11/1993 | Brossard | B65G 69/183 141/292 |
| 5,354,023 | A | * | 10/1994 | Meeks | B05B 11/00 248/129 |
| 5,523,519 | A | | 6/1996 | Weber et al. | |
| 6,958,618 | B2 | * | 10/2005 | Amemiya | B23Q 5/34 324/756.03 |
| 7,416,196 | B2 | * | 8/2008 | Brown | B62B 3/008 108/142 |
| 7,690,406 | B2 | * | 4/2010 | Giesen | B65G 69/183 141/275 |
| 2012/0066884 | A1 | * | 3/2012 | Daeschner | B23P 19/00 29/447 |

FOREIGN PATENT DOCUMENTS

| | | | | |
|---|---|---|---|---|
| EP | 0754636 | A1 | * 1/1997 | ........... B65G 69/183 |
| EP | 1 940 565 | A2 | 7/2008 | |
| FR | 2 695 343 | A1 | 3/1994 | |
| FR | 2722607 | A1 | 1/1996 | |
| JP | H0986892 | A | 3/1997 | |

OTHER PUBLICATIONS

Preliminary French Search Report for French Application No. 1754062, dated Jan. 2, 2018.

* cited by examiner

TROLLEY FOR HANDLING A CONTAINER INTENDED FOR CONNECTION TO AN INSULATOR

TECHNICAL DOMAIN AND PREVIOUS TECHNICAL STATE OF THE ART

The present invention concerns a trolley for ha handling at least on container intended for a hermetically sealed connection to an insulator and a system comprising such a trolley.

In a certain number of industrial sectors, among which the nuclear, medical and, pharmaceutical sectors, it is necessary or desirable to perform certain tasks in a confined atmosphere, either in order to protect personnel, for example from radioactivity, toxicity etc, or on the contrary to enable such tasks to be performed in an aseptic or dust-free atmosphere, or, finally, both at the same time, for example in the case of injectable anticancer medicine preparations.

In fact, the transfer of an apparatus or product from one enclosure to another, without at any moment breaking the seal of either of the enclosures with respect to the external surroundings represents a difficult problem to resolve. This problem may be solved by the use of a double door connection device or RTP (Rapid Transfer Port).

Such a double door device equipped with a multiple safety control is for example described in document FR 2 695 343. Each enclosure is sealed by a door fitted in a flange. Each door is attached to its flange via a bayonet mounting and the two flanges are intended to be coupled together via a bayonet connection.

In the event that one of the enclosures is formed by a container and the other enclosure by a glove box, part of the double door device is brought by the glove box Called the alpha part, and the other part of the double door device is brought by the container Called the beta part.

The transfer is conducted as follows. The flange in the beta part comprises lugs on its outer edge intended to correspond with an imprint on the flange for part alpha. The flange for part beta is introduced into the flange of part alpha, the container is orientated such that the lugs line up with the imprint. A first rotation of the container about the axis of its door connects together the flange for part beta and the flange for part alpha via the bayonet mounting. A second rotation of the container, about the same axis and in continuity with the first rotation, pivots the door of the container relative to the container, ensuring a coupling via another bayonet mounting to the door of the glove box and a disconnection of the new assembly formed by the two doors connected together from the door and glove box flanges.

The positioning of the container and its rotation are often performed manually by the operator, which may be problematic in the case of a container which is heavy to handle, in cases where the configuration of the installation does not allow the operator to work easily, for example due to difficult access to part Alpha, due to a lack of visibility for the operator to position part Beta, and then to connect it to part alpha. This difficult access and lack of visibility occur in particular when part alpha is horizontal in the bottom of a glove box or an insulator, and the container with part beta is laid underneath the glove box. The operator then has to reach under the glove box to perform the different operations.

Furthermore, these positioning Connection and disconnection operations may have to be performed frequently by the operator.

Document EP 1 940 565 describes a system for transferring waste from an insulator to a container. As the waste removal zone and the connection to the container are located in the bottom of the insulator, the container is then positioned under the insulator opposite the waste removal zone and connection. To do so, the container is laid on a trolley for positioning beneath the insulator. The trolley comprises means for lifting the container and aligning parts alpha and beta.

Part beta comprises pins protruding radially and part alpha comprises notches to accommodate these pins. The container is positioned approximately opposite the evacuation and connection zone, the operator has to determine whether or not the container is correctly positioned. Additionally, the pins are not necessarily directly aligned with the notches. Guide ramps are therefore provided to guide the pins into the notches and the container is mounted free to rotate on the trolley in order to allow the pins to slide over the guide ramps.

This device generates a degree of uncertainty during connection. Indeed, if the container is not vertically aligned to the removal and connection zone, the connection cannot be achieved. The container must then be lowered and its position re-adjusted. This results in an additional risk of damage to the different components and a reduction in the frequency of connections, disconnections.

Moreover connection demands both a specific structure for the removal and connection zone with guide ramps and a trolley on which the container can pivot freely, to enable the pins to be aligned. Also, this trolley is only suitable in the case that connection is achieved through radial pins. This structure is not suitable, for example, for a connection via lugs.

PRESENTATION OF THE INVENTION

Consequently, one objective of the present invention is to provide a handling trolley for handling at least one container intended for connection to an insulator or a glove box ensuring quicker and safer connection than with the trolley of the state of the art.

The objective stated above is achieved by a transport trolley for at least one container having a longitudinal axis, intended to be connected to a sealed enclosure by a rotational motion about said axis of rotation, the trolley comprising means of angular orientation for the container relative to the trolley. Additionally, the trolley comprises means for positioning relative to the insulator.

Thus, when the container is positioned beneath the insulator, on the one hand, part beta is directly opposite part alpha, no adjustment is required by the operator. On the other hand, the means of connection of part beta is directly aligned with the means of connection for part alpha. No guidance or rotation of the container is required to ensure proper alignment.

In other words, the trolley whose position in relation to the insulator is determined, fixes an angular orientation to the container such that it is ready to mate with part alpha. The connection between the insulator and the container is definite and can therefore be achieved rapidly. The frequency of connection can therefore be increased. Additionally, the risk of damage is diminished.

In one example of execution, the trolley comprises means to permit rotation of the container in order to make the connection between parts alpha and beta. Advantageously this rotation is prevented as long as part beta is not mated with part alpha.

The trolley comprises means for lifting the container. In one example, these means are provided by jacks. Advantageously the trolley comprises means of limiting the torque in order to interrupt the lifting of the container once part beta has mated with part alpha.

The subject-matter of the present invention therefore is a trolley for handling at least one container intended for sealed connection to an insulator through sealed connection means, said connection being achieved by relative rotation of the container and a part of the insulator around a roughly vertical axis, said trolley comprising a support plate intended to support the container, means permitting displacement of the trolley relative to the floor, means for lifting the container in order to mate the container with the insulator, first means of indexing the position of the trolley relative to the insulator, said first means being intended to correspond with second means of indexing the position mounted on the insulator, and means of angular orientation of the container in relation to the trolley such that the container adopts a predetermined position relative to the insulator, when the trolley is in the position determined by the cooperation between the first and second means of indexing.

Advantageously, the trolley comprises means for rotating the container about said vertical axis once the container has mated with the insulator. For example, the handling trolley comprises a housing free to rotate relative to the support plate, said housing comprising the means for angular orientation.

According to an additional advantageous comprise, the trolley comprises means to prevent the rotation of the container as long as the container has not mated with the insulator. These means for preventing rotation of the container may comprise a stop against rotation intended to cooperate with said housing, said stop being for example such that it is retracted when the container is in the mating position.

According to an additional advantageous comprise, the trolley may comprise means for preventing the container from leaving its mated position as long as it is not in a connected state or a disconnected state. The means for preventing the container from releasing its mated position may comprise a vertical stop preventing the housing from lowering if it is not in a position in which the container is connected or disconnected.

Angular stops to limit the rotation of the container during the connection or disconnection phase may advantageously be provided.

The lifting means preferably comprise means for limiting the torque such as to interrupt lifting of the container as soon as the container is mated to the insulator.

The handling trolley may also comprise means for securing the container on the trolley. These securing means comprise for example means capable of exerting a tightening load on the container in the direction of the support plate. In one example of execution, such means capable of exerting a tightening load comprise a tightening plate intended to contact the top end of the container and means of securing the position of the retaining plate such that it exerts a tightening load.

The support plate may advantageously comprise flexible means intended to support at least part of the container.

The angular orientation means comprising for example at least one notch and at least one lug, one notch or lug being on the housing and one lug or notch being on the container.

Another subject-matter of the present invention also is an installation comprising an insulator comprising a connection zone positioned horizontally and suspended above the floor by a support structure, at least a trolley in accordance with the present invention, said support structure comprising the second position indexing means capable of cooperating with the first position indexing means mounted on the trolley.

BRIEF DESCRIPTION OF THE DRAWINGS

The present invention is easier to understand on the basis of the description below and the drawings in the appendix in which.

DETAILED DESCRIPTION OF PARTICULAR EXECUTION MODES

Figures 1, 2:
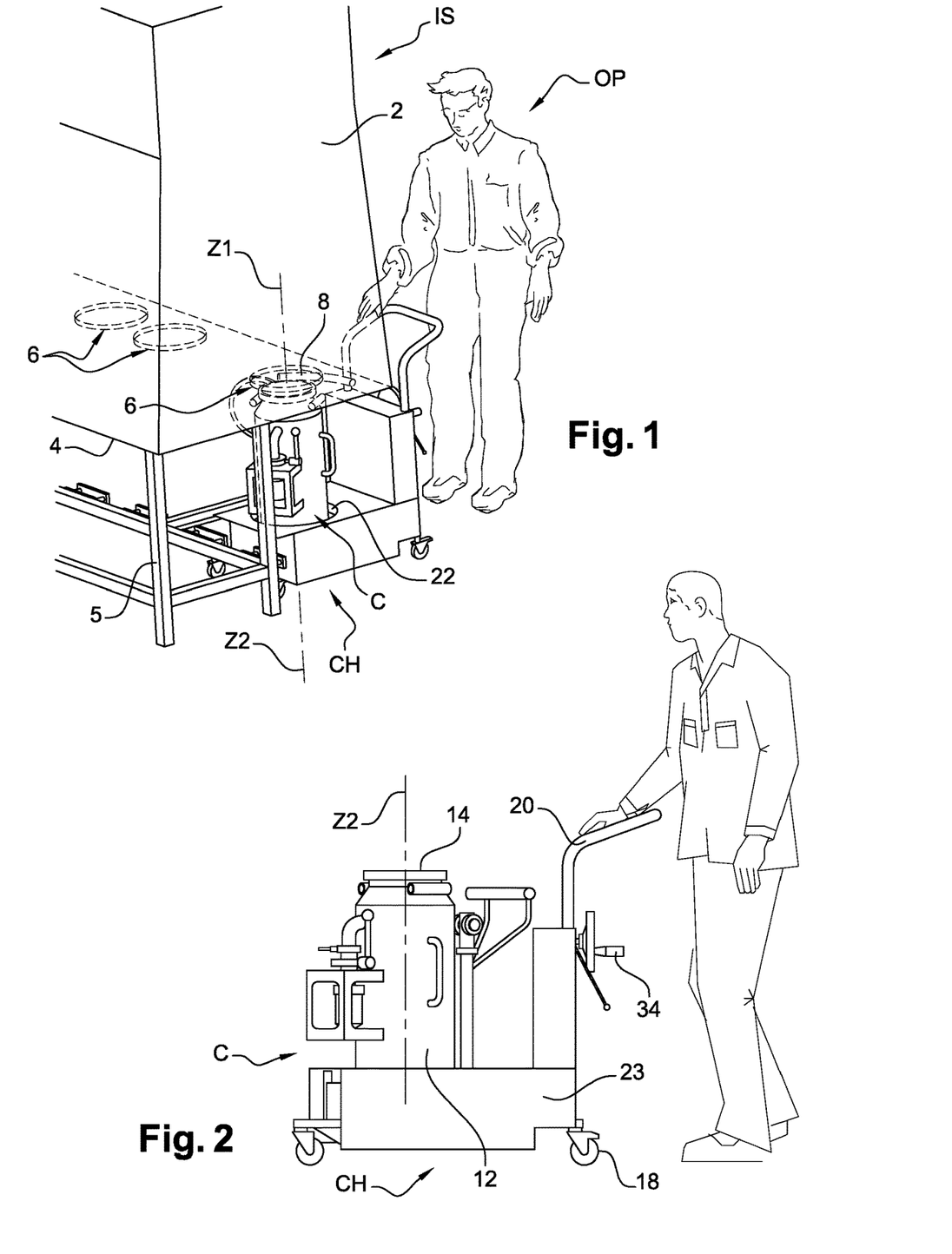
FIG. 1 is a perspective view showing an example of a trolley produced in accordance with the invention, transporting a container, during its positioning under an insulator.
FIG. 2 is a side view of the trolley in FIG. 1, with the container.

FIG. 1, shows an example of execution of a trolley CH, in accordance with the invention transporting a container C, for connection to an insulator IS.

Insulator IS is for example a glove box.

The insulator IS Comprises walls 2, and a bottom 4 Comprising several zones 6, each comprising an alpha part for connecting the containers and thus provide a leakproof passage between the internal enclosure of the insulator IS, and the internal enclosure of the container. The insulator is supported by a structure 5, such that its bottom is a certain distance from the floor.

A leakproof connection system, also known as a double door system, belongs to the container and to the insulator. It comprises so-called alpha parts, fitted to the zones 6, and fitted to the insulator and a beta part fitted on the container.

Each zone 6, has an opening, 8, surrounded by a flange and hermetically sealed by a door. The flange and the door form part alpha.

The alpha and beta parts have shapes of revolution around an axis of revolution. Part alpha extends around a longitudinal axis Z1.

The container comprises a container 12, around longitudinal axis Z2 Comprising an opening edged with a flange and hermetically sealed by a door 14, the flange and the door form part beta. The axis of part beta is congruent with axis Z2.

During connection of the container to the insulator, the longitudinal axis Z2 is intended to be orientated vertically and axes Z1 and Z2 are coaxial.

The connection between part beta and a part alpha is obtained by positioning part beta in contact with part alpha and applying a rotary motion between part alpha and part beta, such as to connect together the flanges, for example via a bayonet type connection Connecting the doors together, for example via a bayonet type connection, and releasing the doors from the flanges.

Figures 3A, 3B, 4:
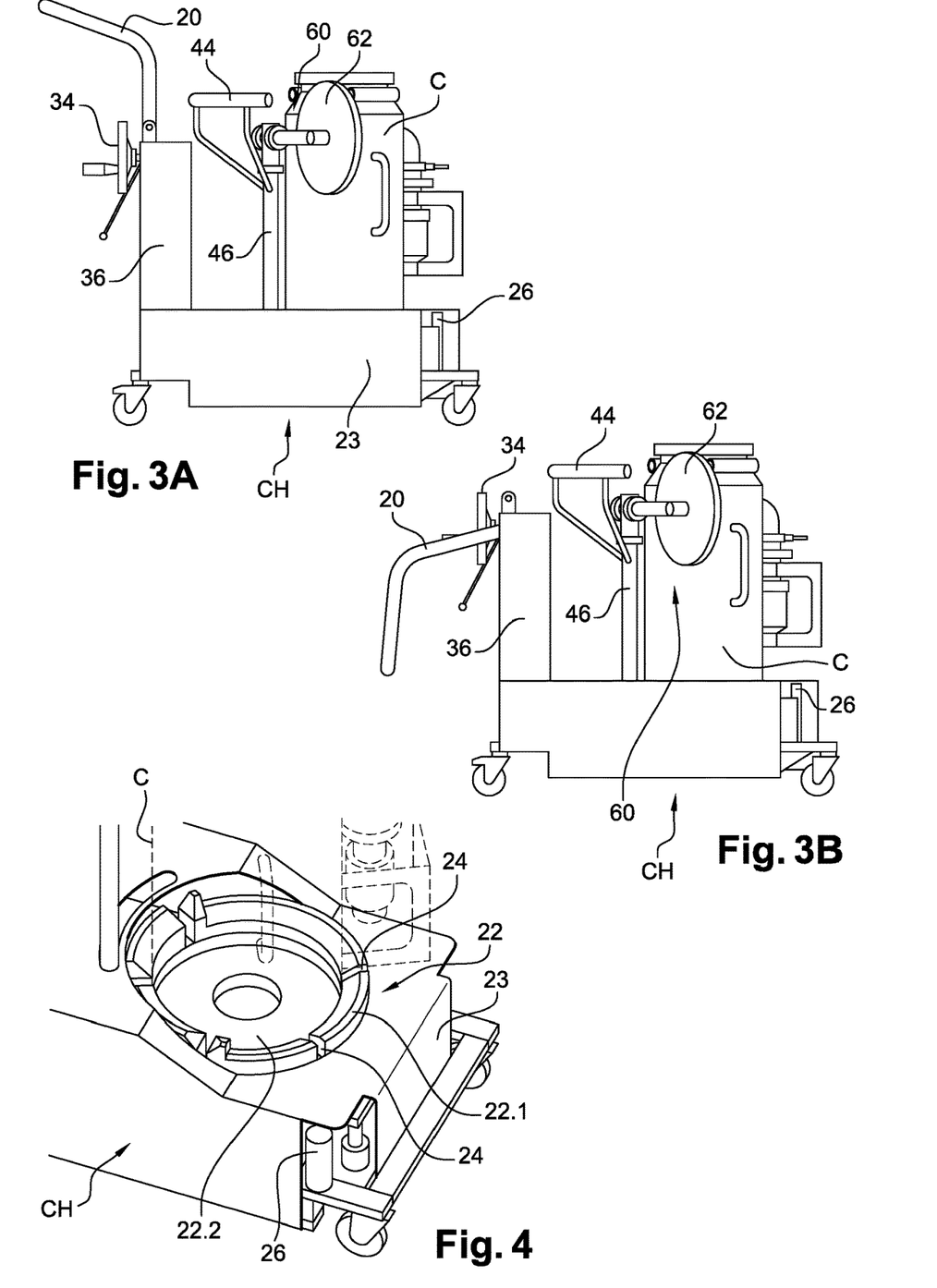
FIG. 3A is a view of the other side of the trolley in FIG. 2.
FIG. 3B is a similar view to that in FIG. 3A, with the trolley in a different configuration.
FIG. 4 is a detailed view of the support plate on the trolley in FIG. 2, the container is shown in transparency.

FIGS. 2, 3A, 3B, show the trolley CH, supporting the container C, for transporting it and positioning it beneath the insulator or to move it away from the insulator and transport it to a storage zone for example. The trolley is moved manually by an operator OP.

The trolley is built on a chassis 15, visible in FIGS. 7A, 7B, 8A and 8B, fitted with wheels 18, for moving the trolley across the floor, a handle 20 IS gripped by the operator when moving the trolley. Advantageously the handle 20, may adopt at least two positions, a raised position (FIG. 3A) for moving the trolley and a folded position (FIG. 3B) to facilitate access to the means for mating and connection. The trolley also comprises a support plate 16, visible in FIGS. 7A, 7B, 8A and 8B, intended to support the container C.

A cover 23, comprising side walls and a top plate is also provided to mask the various moving parts. It thus reduces the risk of injury. It additionally makes the system suitable for use in pharmaceutical environments, by ensuring the cleanability of the system and limiting any possible emission of particles generated by the mechanical systems.

In the description, the rear part of the trolley refers to the part fitted with the handle and the front part of the trolley refers to the part of trolley opposite to the rear part and which is the zone which accommodates the container.

Additionally, displacement of the trolley could be assisted by an electric motor or could be fully powered with or without guidance by an operator. It could also be imagined that the trolley moves on rails between the insulator and a container loading zone.

FIG. 4, shows a detailed view of the trolley from above. The trolley comprises a recessed housing 22, whose shape corresponds to the transverse section of the bottom of the container and intended to accommodate the bottom of the container. The housing 22 Comprises a side wall 22.1 and a bottom 22.2, on which it is intended to place the container.

The top plate of the cover 23 comprises an opening on which the housing 22 can slide.

The housing 22 comprises means of angular orientation for the container C, relative to the trolley CH, such that the angular position of the container on the trolley can be determined and is not random.

In the example shown, the means of orientation comprises at least one notch 24, formed in the side wall 22.1, of the housing 22, and intended to accommodate a lug (not visible) projecting radially from the bottom part of the container. These means of orientation are designed such that the container C, and in particular its part beta, adopts the correct orientation for mating with part alpha.

Advantageously, the means of orientation comprises several notches in order to enable the container to be orientated at different angles, and thus adapt to different configurations of part beta and/or the insulator. In order to avoid confusion by the operator, the notch to use may be identified by a visual mark, such as a colour, one or more letters, one or more numbers, or any notches not to be used may be masked.

The cooperation between the notch and the lug transmits the rotation of the housing to the container. Nevertheless, in general, the weight of the container is sufficient to generate enough friction between the bottom of the housing and the bottom of the container and the rotation of the housing is applied directly to the container.

As a variant, the side wall 22.1, of the housing 22 could comprise a lug projecting radially inwards and the bottom part of the container could have a notch suitable for accommodating the lug. As a further variant, one might consider that the means of orientation are for example be electrical, electronic, optical or magnetic.

Additionally, the trolley CH Comprises means for indexing its position in relation to the insulator IS, particularly relative to part beta, such as to ensure the positioning of part beta at or vertically aligned with part alpha, i.e. such that axis Z1 of part alpha and axis Z2 of part beta are coincident.

Figure 5:
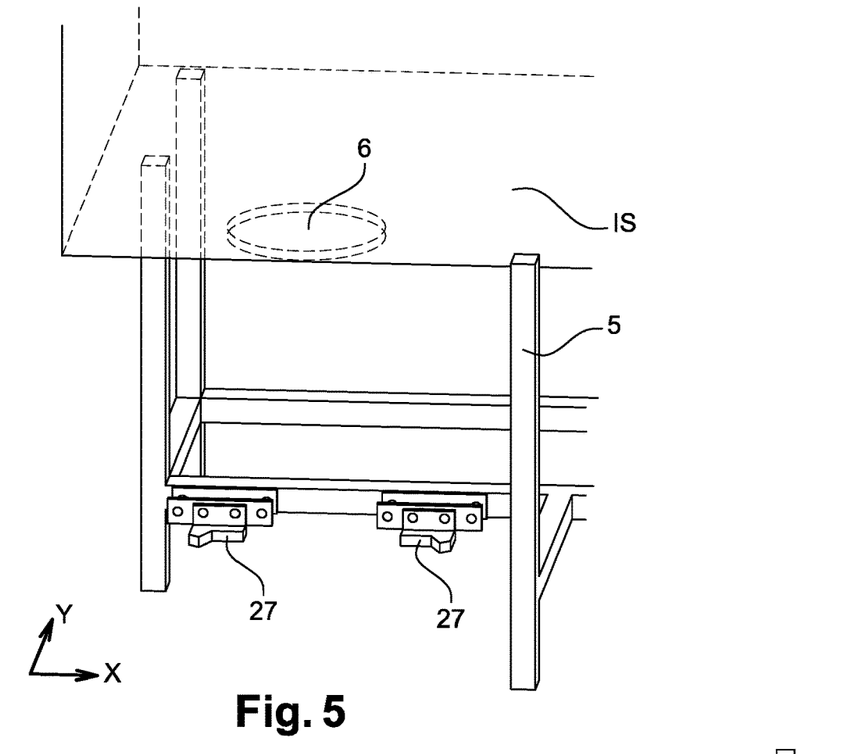
FIG. 5 is a detailed view of the insulator support structure.

In the example shown, the front part of trolley CH comprises two rods 26, orientated vertically and each positioned on one side of the trolley and the support structure of the insulator comprises a device for indexing the position of the trolley, intended to accommodate the two rods 26. FIG. 5 shows an example of the indexing means comprising two plates 27, each comprising a housing intended to partially surround a rod 26. In the example shown, the housings are orientated facing one another. As a variant, they could be orientated outwards. These indexing means determine the position of the trolley CH, in the plane, in both direction X and direction Y.

The trolley may preferably comprise brakes to arrest the trolley in relation to the insulator during the mating and connection stages.

Advantageously, the bottom 22.1 of housing 22 comprises a protuberance 21, of elastic material (FIG. 11), such as rubber, for correcting any lack of flatness of the floor and thus to keep part beta roughly horizontal.

The trolley comprises means for moving the container in the vertical axis, such as to mate part beta with part alpha.

In the example shown, the housing 22 can move vertically.

FIGS. 7A, 7B, 8A and 8B, show the trolley without the cover 23. The support plate 16 supports the housing 22 and is able to move vertically via lifting means 30.

Figure 6:
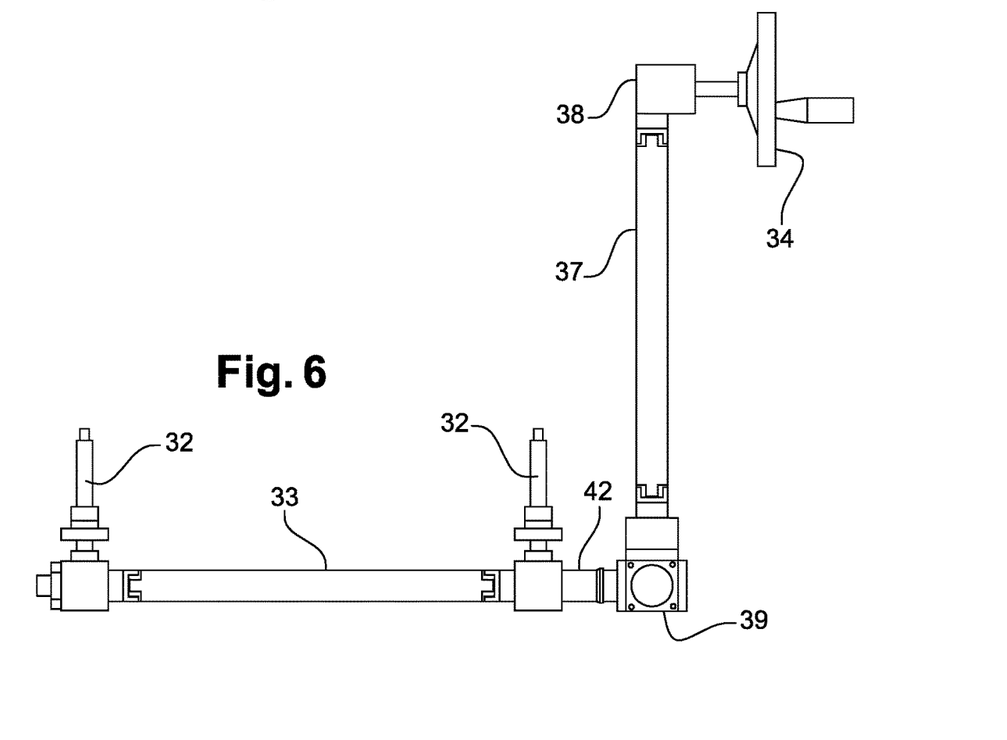
FIG. 6 is a side view of the trolley lifting means, shown on its own.
Figure 7A:
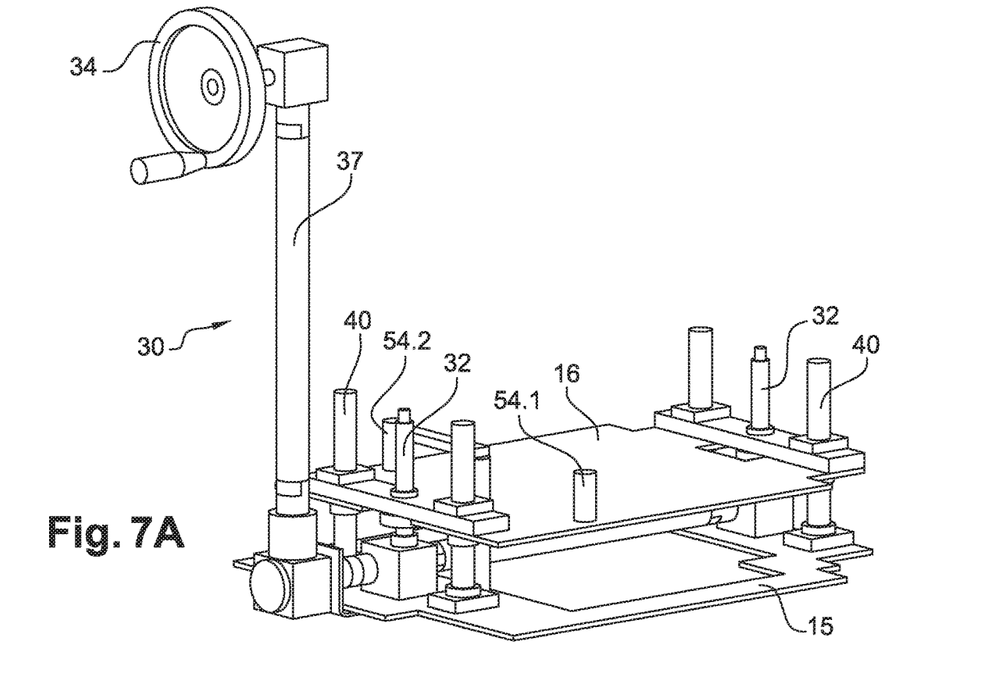
FIGS. 7A and 7B are 3-D views of part of the elements of the trolley in the lowered position and in the raised position respectively.
Figure 7B:
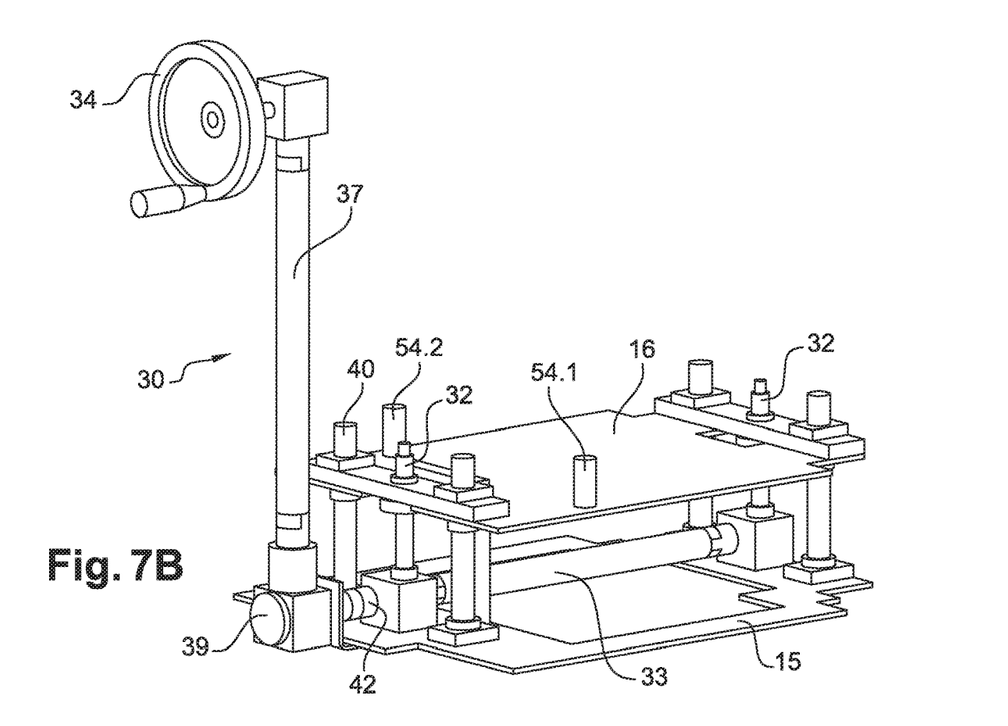
Figure 8A:
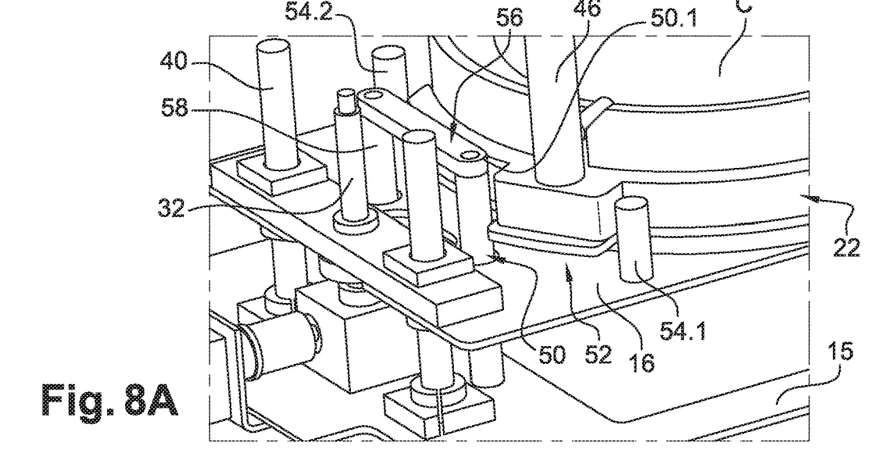
FIGS. 8A and 8B are detailed perspective views of part of the elements of the trolley, in the lowered position and in the raised position respectively, the housing and the container being shown in addition compared with FIGS. 7A and 7B.
Figure 8B:
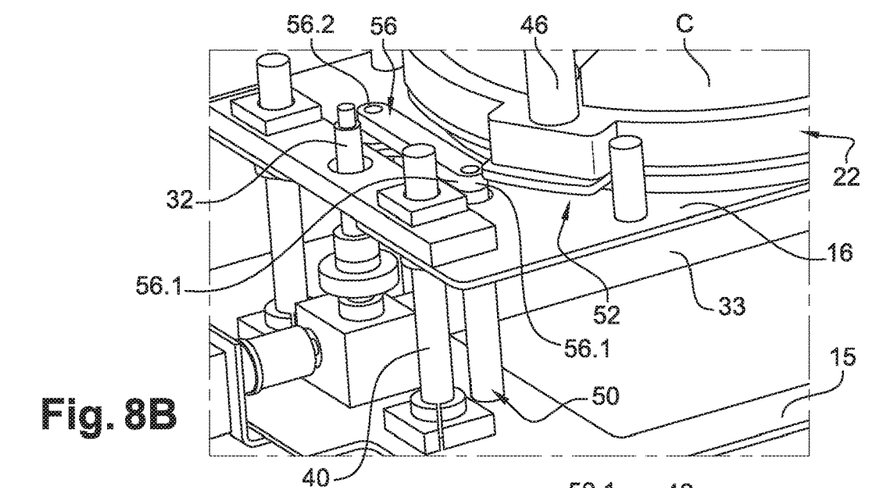
Figure 9:
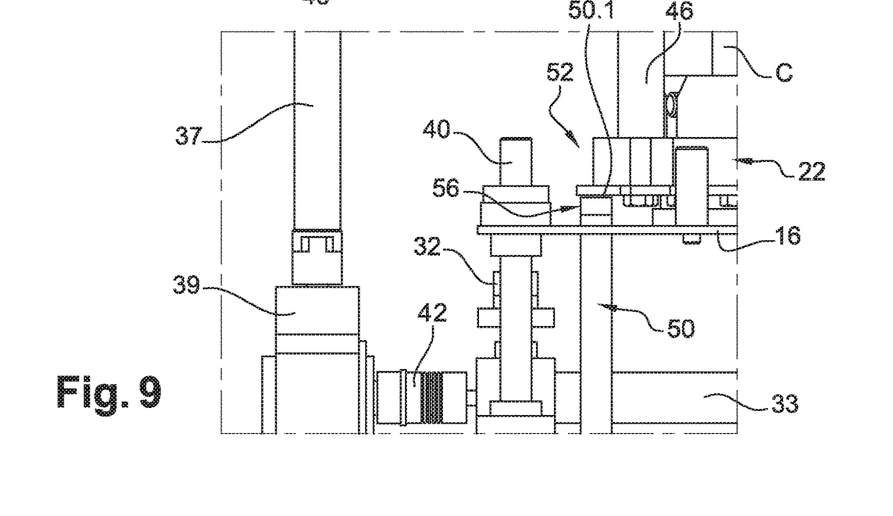
FIG. 9 is a side view of certain elements of the trolley in an intermediate state between the connected state and the disconnected state.

The lifting means, shown alone in FIG. 6 Comprise, in the example shown, two rotating screw jacks 32, one at the back of the trolley and the other at the front of the trolley CH, and a handwheel 34, which when rotated extends or retracts the jacks. The two jacks 32, are linked together mechanically by a first transmission shaft 33, such that the jacks both move simultaneously and the support plate 16, moves approximately horizontally. In this example and advantageously, the handwheel 34 IS located approximately level with the handle and is mounted on a column 36, such that it is at a height easily accessible by the operator. Additionally, the handwheel 34 IS advantageously orientated such that its axis of rotation is horizontal, reducing the size of the assembly, improving ergonomics and avoiding any interference between the handwheel 34, and the handle 20. The column 36 IS traversed by a second transmission shaft 37 which is connected mechanically to the handwheel 34, and to the first transmission shaft 33, by angle transmissions 38, 39 respectively. Advantageously a speed step-up gearbox is fitted between the second transmission shaft 33, and the first transmission shaft 37. As a variant, the handwheel 34, may be installed with its axis of rotation vertical and be connected directly to the second transmission shaft 37; in such case the angle transmission 38 IS omitted. In the example shown, the trolley advantageously comprises four guide columns 40, orientated vertically, passing through the support plate in its four corners in order to guide the plate during its vertical displacements.

Very advantageously, the lifting means comprise a torque limiter 42, in order to decouple the first 33, and second 37, transmission shafts as soon as the torque exceeds a given threshold, the threshold overshoot resulting from the mating of part beta with part alpha. Thus since the mating is secured, it may for example be undertaken by inexperienced personnel, and the risk of damage is limited.

As a variant, this safety function could be achieved using a presence sensor located on part alpha or beta, activating an alarm light or horn to warn the operator to stop lifting the container, or to decouple the two transmission shafts. The adoption of a mechanical torque limiter provides the advantages of a robust system which cannot be ignored as opposed to an alarm, for example, which could be missed by an inexperienced person.

The rotary screw jacks 32 could be replaced by pneumatic or hydraulic jacks, however hydraulic jacks can lead to pollution. As a further variant, the lifting means could be a scissors arrangement.

Figures 10A, 10B, 11:
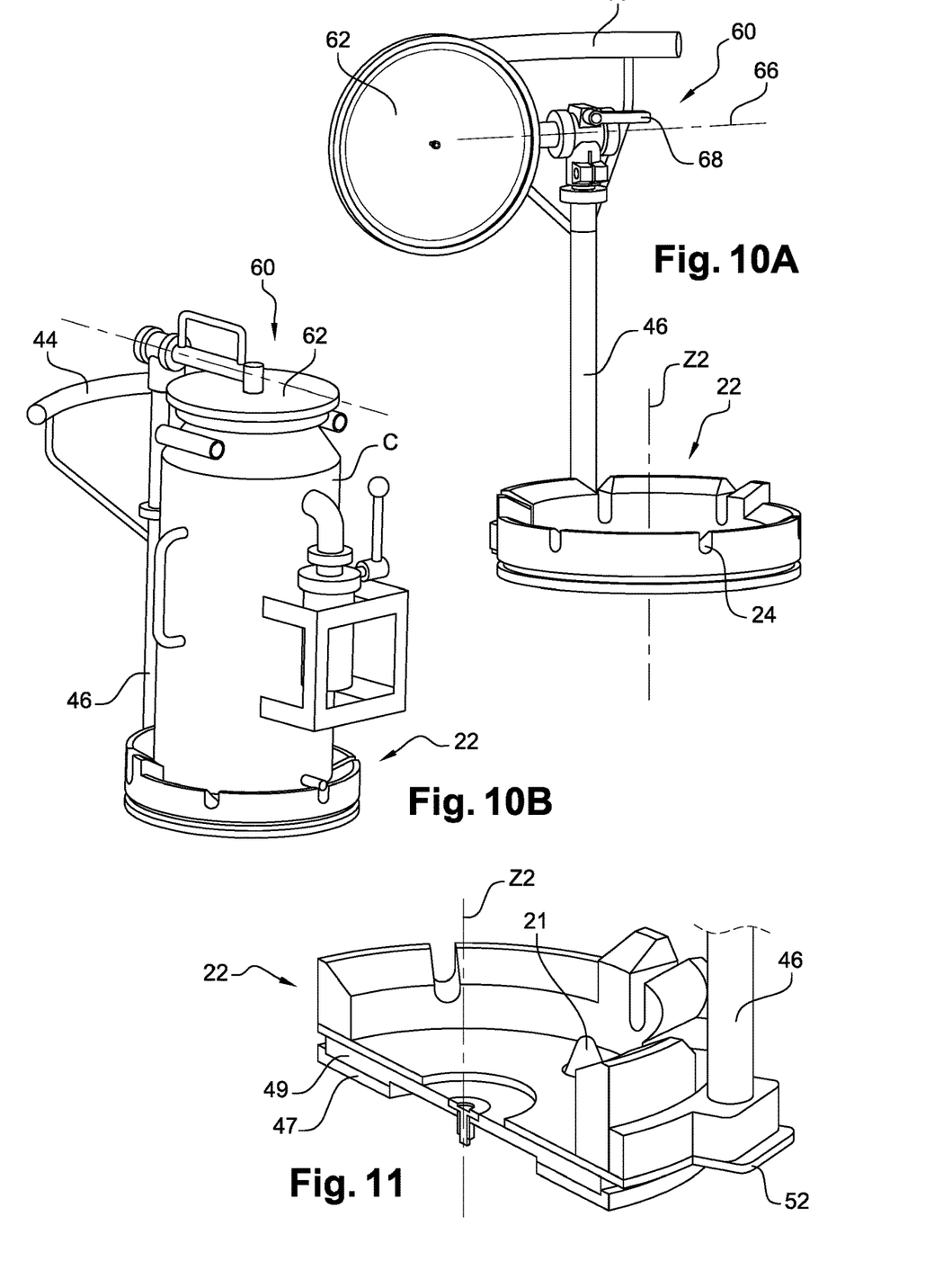
FIGS. 10A and 10B are 3-D views of the means of securing the container on the trolley in two different positions.
FIG. 11 is a sectional perspective view of part of the trolley at the housing in the bottom of the container.

In this execution example, the connection between parts alpha and beta is achieved by rotation of the container about the Z2 axis. To do so, the trolley CH, has a device for rotating the container about the Z2 axis. In the example shown, the housing 22 IS mounted free to rotate relative to the support plate 16. FIG. 11 shows a sectional view in 3-D of the zone of the trolley supporting the housing 22. The trolley comprises a part 47, fixed in rotation, a part 49, free to rotate about the Z2 axis, which is secured to the bottom of the housing 22. Advantageously, part 47 is annular in shape, in order to limit the friction surface in contact with part 49.

Rotary displacement is achieved via a connection handle 44, secured in rotation to the housing 22. Advantageously, the handle 44 IS fitted at the top of a column 46, in order to be at a suitable height for the operator. Column 46 is attached to a radial protrusion 52, in the bottom 22.1 of housing 22, in order to be able to drive it in rotation about the Z axis.

For example, the handle 44 IS located in front of the displacement handle 20, and is easily accessible when the displacement handle 20 is folded down.

Very advantageously, the trolley comprises means to prevent any rotation of the container as long as part beta has not been mated with part alpha. In the example shown, these means prevent any rotation of the housing about the Z2 axis as long as part beta has not been mated with part alpha, i.e. as long as the housing is not in a lifting position corresponding to such mating.

Advantageously, the means for preventing rotation of the container comprise a stop 50, attached to the chassis 15, and located close to and outside the side wall 22.1 of the housing.

The stop 50 Comprises a rod and an upper end 50.1, opposite to a lower end which is attached to the chassis 15, which is located at a determined height along the Z2 axis, such that when the container C IS in the lifting position for mating, the upper end 50.1 of the stop does not protrude from the support plate 16, and no longer prevents rotation. However, as long as the support plate 16, and therefore the housing and the container are in a position below the mating position, the stop 50, prevents any rotation of the container. As we shall see below, the trolley advantageously comprises a vertical stop which is partly coincident with the upper end 50.1, of the stop 50.

The trolley advantageously comprises means to limit the angular displacement of the container such as to avoid forcing parts beta and alpha. In the example shown, they comprise two angular stops, one angular stop for disconnection 54.1, and a radial stop for connection 54.2, secured to the plate and forming the angle required with one another for proper connection or disconnection of parts alpha and beta, for example 60°. Advantageously, the angular stops 54 Correspond with the radial protuberance 52. In consequence, in the disconnected state, the radial protuberance 52 IS in contact with the radial disconnection stop 54.1, and in the connected state, the radial protuberance 52 IS in contact with the angular connection stop 54.2. This embodiment limits the number of elements to be used by attributing two functions to the stop 50. It should be accepted, however that a trolley using a different stop to correspond with the angular stops remains within the scope of the present invention.

Also very advantageously, the trolley comprises means to prevent lowering of the container as long as it has not fully reached its connection position or its disconnection position. These means comprise a vertical stop 56 for the housing 22, whenever it is in an intermediate angular position between the connection and disconnection states. In the example shown and advantageously, these means involve the radial protuberance 52, of the housing 22 and the vertical stop 56, stretching horizontally and angularly around the housing between the stop 50, and another rod 58, which acts as a support.

The vertical stop 56 Comprises two angular ends 56.1 56.2, the distance between angular end 56.1 and the disconnection angular stop 54.1 corresponds approximately to the angular extension of the radial protuberance 52, similarly the distance between the angular end 56.2, and the angular stop for connection 54.2 corresponds approximately to the angular extension of the radial protuberance 52. In this example, the angular end 56.1, of the radial stop 56, forms the upper end 50.1 of the stop 50. In a variant without a vertical stop, the upper end 50.1 would be formed by the free end of the rod for the stop 50.

In this example, the free end of the stop 50 IS formed by the vertical stop 56. But it could be intended that they remain distinct.

It must be understood that, according to an example, the means for ensuring safe connection and disconnection may involve mechanical, electrical, optical, electronic sensors etc., particularly in the case of a trolley which is fully or partly powered. The signals emitted by the sensors then allow or inhibit the vertical displacement of the container and/or the rotation of the container. The connection and disconnection stages can then be automated. According to another example, sensors may be combined with mechanical means.

Very advantageously, the trolley also comprises means 60, for securing the container to the trolley in order to prevent it from toppling for example, due to an uneven floor or a collision.

In the example shown, the securing means 60 Comprise means for applying a vertical clamping force to the container to clamp it against the bottom of the housing. In the example shown, the securing means 60 comprise a holding plate 62, mounted on the displacement handle and intended to bear in planar manner on part beta of the container C.

On the one hand, the holding plate 62 can move vertically, in order to be able to adjust its position vertically to the height of the container and effectively apply a clamping force. On the other hand, the support plate is advantageously mobile in rotation about a vertical axis in order to allow alignment of the holding plate 62, with the axis of the container. To do so, it is for example intended that the column should be telescopic in at least two parts, both parts of which can slide over one another along the vertical axis and can pivot relative to one another, around the vertical axis. Means of indexing, for example a thumbwheel, determine both the position along and around the vertical axis of the two parts of the column to establish the length of the column.

Advantageously, the holding plate 62 can pivot in order to adopt a vertical position and provide access to the container to avoid obstructing its positioning under the insulator. To that end, the holding plate 62 is connected to the column by a horizontal axis pivot link 66. A lever 68 is provided to clamp the holding plate 62, at least in the vertical position or the horizontal position.

The operation of the trolley will now be described.

The operator wishes to connect the container C, to the insulator IS.

First of all, he places the container C, in the housing 22 on the trolley CH, the container is automatically correctly orientated angularly by insertion of the lug on the container in the appropriate notch in the housing 22.

He places the holding plate 62, on the container C, and applies a tightening load to the container C through it.

The operator then moves the trolley CH, towards the insulator IS. Before placing the container under the insulator, he removes the holding plate 62, separating it vertically from part alpha, by pivoting it around the vertical axis such as to separate it from the container, then putting it in the vertical position.

Figure 12A:
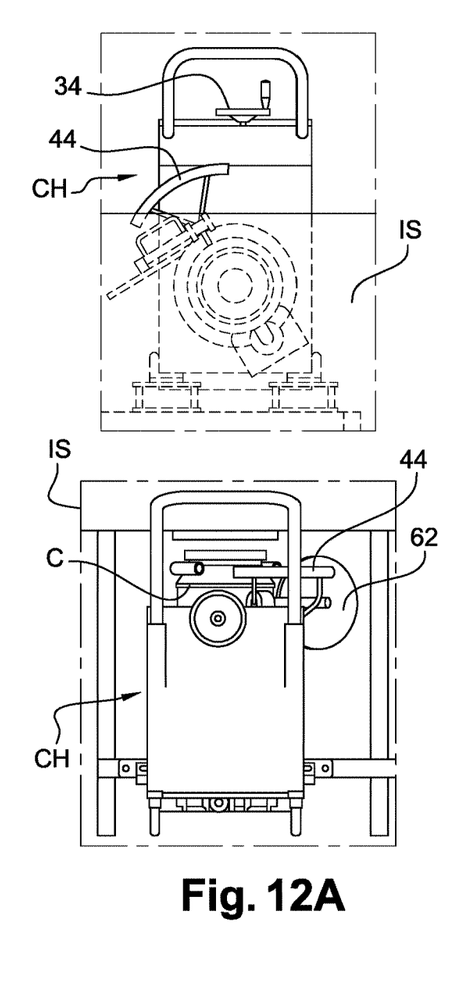
FIGS. 12A to 12C are rear views of the trolley and the container and top views of the trolley and the container, the insulator being shown in transparency, during a connection operation.

The operator then places the container under the insulator (FIG. 12A) until the indexing rods make contact with the indexing plates attached to the support structure. Axis Z2 of part beta is aligned with axis Z1 of part alpha and the connection means on part beta, lugs for example, are aligned with the connection means on part alpha, notches for example. The operator may or may not fold down the displacement handle.

Figure 12B:
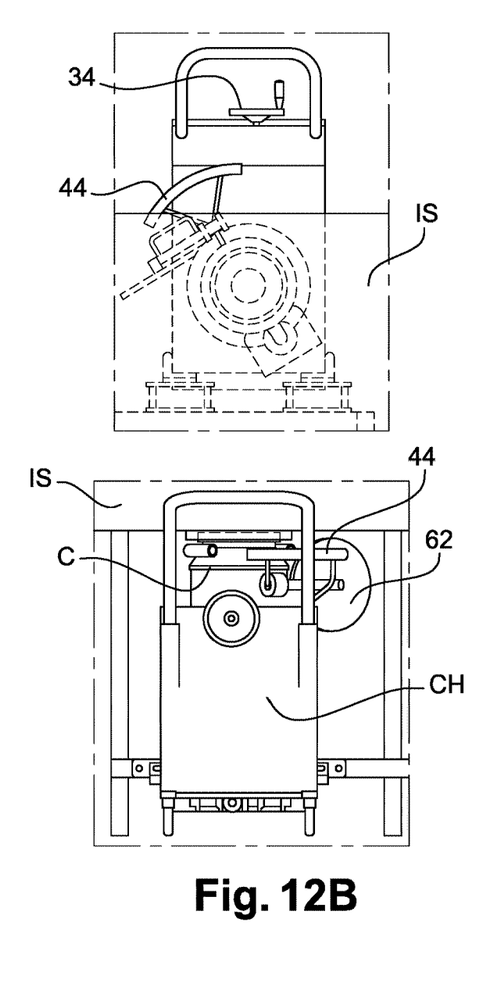

The operator then lifts container C for mating to the insulator IS. To do so, he turns the handwheel which lifts support plate 16. When part beta is mated to part alpha (FIG. 12B), thanks to the torque limiter, lifting of the container is automatically arrested. The mating is achieved without any setting or angular adjustment since the angular orientation of the container is determined by the housing on the trolley. In this position the radial protuberance 52, on housing 22 is passed over the free end of the rod forming stop 50.

Figure 12C:
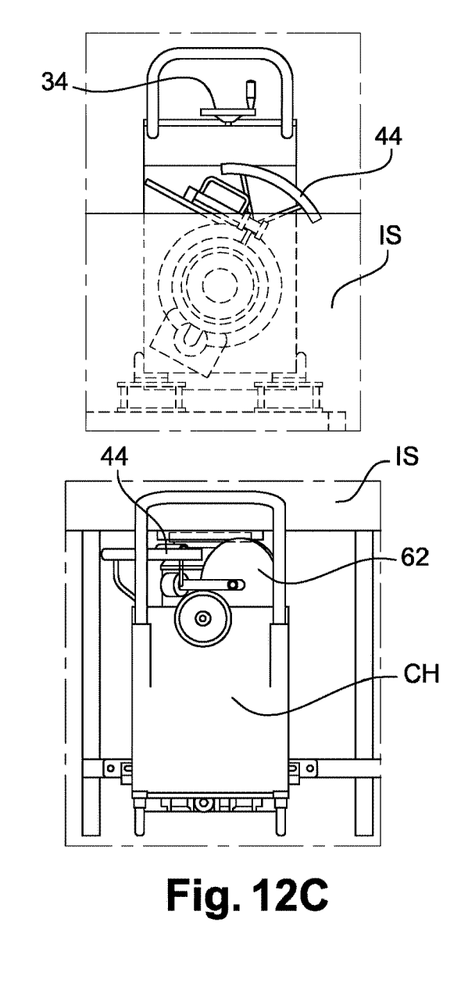

During a subsequent stage, the operator pivots container C by operating the connection handle 44, attached to the housing 22. The operator adjusts the connection handle until the radial protuberance 52, makes contact with the angular connection stop 54.2 (FIG. 12C).

During this rotation, the flanges on parts alpha and beta are connected, the doors are connected and are released from the flanges and can be removed from inside the insulator to establish the communication passage between the two enclosures.

The operator can lower the housing because the radial protuberance 52, has gone beyond the vertical stop 50.

This mating operation does not require any adjustment on the part of the operator, he merely has to position the indexing rods against the stops via the indexing plates. In fact, the correct positioning of the container in the housing is relatively natural, because if the lug is not in the appropriate notch, the container is inclined and the inclination is sufficient to alert the operator. This is all the more so since such inclination prevents the correct positioning of the retaining plate. All the stages are guided and any false moves are prevented.

In order to disconnect the container from the insulator, the doors must be reinstalled. Assuming that the trolley is already under container C and that housing 22 is in the connection position, housing 22 is lifted to support container C, the lug automatically enters the notch in housing 22. Housing 22 is then pivoted in the disconnection direction, until the radial protuberance 52, makes contact with the angular disconnection stop 54.1.

Housing 22 and container C may be lowered. Trolley CH is then removed from under the insulator.

In another execution example, the trolley may comprise means to prevent displacement of the trolley when the container is between the decoupled position and the coupled position and/or when the housing is in the raised position. For example, the trolley may comprise means to raise the entire trolley using a system of telescopic legs, which lifts the wheels of the trolley off the floor. In this example, it is therefore not necessary to have vertical mobility of the housing relative to the trolley.

The invention provides a device which simultaneously enables transport, mating and locking.

Furthermore, operation of the trolley is ergonomic and limits the efforts to be made by the operator to achieve a connection between a container and an Alpha part.

Moreover, the example of a trolley illustrated and described in detail IS entirely mechanical, it is extremely robust and highly reliable.

Additionally, as already explained above, it is suitable for use in clean environments, such as are used in pharmaceutical production, as it generates few particles and those produced are retained inside the system.

In the example shown, the connection between the insulator and the container is achieved by rotation of the container. In another execution example, this connection may be obtained by rotation of one or more elements of part alpha. This execution is particularly advantageous when part alpha is powered, indeed its accessibility by the operator is generally reduced. According to another example, one could consider rotation of both the container and part alpha.

Furthermore, according to another example, the trolley could comprise several housings 22 for transporting several containers at the same time, and ensure their mating and their connection to several alpha parts for one or more insulators.

What is claimed is:

1. A trolley for handling at least one container for leak-proof connection to an insulator by a hermetically sealed connector, said sealed connector comprising a first part on the container and a second part on the insulator, said container comprising a longitudinal axis and an opening edged by a flange and hermetically sealed by a door, said trolley comprising a support plate configured to support the container such that the longitudinal axis of the container is orientated vertically, a displacement device for displacing the trolley relative to a floor, a lifter for lifting the container vertically in order to mate the container to the insulator, a first indexer for indexing the position of the trolley relative to the insulator, the first indexer configured to coincide with a second indexer for indexing the position of the container relative to the insulator such as to align the first part and the second part of the sealed connector in the vertical direction, an angular orientation device for angularly orientating the container, said angular orientation device being configured to determine the angular orientation of the container about the longitudinal direction of the container relative to the trolley and a device for rotating the container about a vertical axis.

2. A handling trolley in accordance with claim 1, comprising a housing mobile in rotation relative to the support plate, said housing comprising the angular orientation device.

3. A handling trolley in accordance with claim 2, comprising means for preventing a rotation of the container as long as the support plate is not in a raised position enabling mating of the container to the insulator, and in which the means for preventing a rotation of the container comprise a rotation stop configured to coincide with said housing, said stop being such that it is retracted when the container is in its mating position.

4. A handling trolley in accordance with claim 1, comprising means for preventing a rotation of the container as long as the support plate is not in a raised position enabling mating of the container to the insulator.

5. A handling trolley in accordance with claim 1, comprising means for preventing a rotation of the container as long as the support plate is not in a raised position enabling mating of the container to the insulator and means to prevent the container from separating from its mating position as long as it is not in a connection or disconnection state, said means for preventing a rotation of the container comprising a vertical stop preventing a housing from lowering if it is not in a position in which the container is connected or disconnected.

6. A handling trolley in accordance with claim 1, comprising angular stops limiting rotation of the container during a connection or disconnection phase.

7. A handling trolley in accordance with claim 1, in which the lifter comprises a torque limiting device such as to interrupt lifting of the container as soon as the container is mated with the insulator.

8. A handling trolley in accordance with claim 1, comprising a securing device for securing the container to the trolley.

9. A handling trolley in accordance with claim 8, in which the securing device comprises a tightening member able to exert a tightening load on the container towards the support plate.

10. A handling trolley in accordance with claim 9 in which the securing device comprises a holding plate configured to make contact with the top of the container.

11. A handling trolley in accordance with to claim 1, in which the support plate comprises an elastic device configured to support the container at least partly.

12. A handling trolley in accordance with to claim 1, comprising a housing mobile in rotation relative to the support plate, said housing comprising the angular orientation device which comprises at least one notch or at least one lug, the at least one notch or the at least one lug being located on the housing and corresponding with a lug or notch on the container.

13. An installation comprising an insulator comprising a connection zone arranged horizontally and suspended above a floor by a support structure, at least a trolley in accordance with claim 1, said support structure comprising the second indexer, configured to correspond with the first indexer, fitted to the trolley, such that, when the first indexer cooperates with the second indexer, the container is aligned with the connection zone.

* * * * *